United States Patent
Wang et al.

(10) Patent No.: US 10,522,884 B2
(45) Date of Patent: Dec. 31, 2019

(54) METHOD AND APPARATUS FOR RECYCLING LITHIUM-ION BATTERIES

(71) Applicant: Worcester Polytechnic Institute, Worcester, MA (US)

(72) Inventors: Yan Wang, Worcester, MA (US); Eric Gratz, Worcester, MA (US); Qina Sa, Worcester, MA (US); Zhangfeng Zheng, Worcester, MA (US); Joseph Heelan, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 293 days.

(21) Appl. No.: 15/358,862

(22) Filed: Nov. 22, 2016

(65) Prior Publication Data

US 2017/0077564 A1     Mar. 16, 2017

Related U.S. Application Data

(63) Continuation-in-part of application No. 13/855,994, filed on Apr. 3, 2013.

(Continued)

(51) Int. Cl.
*H01M 10/00* (2006.01)
*H01M 10/54* (2006.01)
(Continued)

(52) U.S. Cl.
CPC ............ *H01M 10/54* (2013.01); *C01G 53/40* (2013.01); *C01G 53/50* (2013.01); *C22B 3/02* (2013.01);
(Continued)

(58) Field of Classification Search
CPC .......... C01G 53/50; C01G 53/40; C22B 3/02; C22B 7/006; H01M 10/54; H01M 10/0525
(Continued)

(56) References Cited

U.S. PATENT DOCUMENTS 5,888,463 A     3/1999  McLaughlin et al.
6,261,712 B1    7/2001  Hayashi et al.
(Continued)

FOREIGN PATENT DOCUMENTS

CN      101284684 A     10/2008
WO      101597689 A     12/2009
WO      2014042136 A1    3/2014

OTHER PUBLICATIONS

International Search Report, PCT/US2016/063294, dated Mar. 30, 2017, p. 8.

*Primary Examiner* — Steven J Bos
(74) *Attorney, Agent, or Firm* — Armis IP Law, LLC

(57) ABSTRACT

Cathode material from exhausted lithium ion batteries are dissolved in a solution for extracting the useful elements Co (cobalt), Ni (nickel), Al (Aluminum) and Mn (manganese) to produce active cathode materials for new batteries. The solution includes compounds of desirable materials such as cobalt, nickel, aluminum and manganese dissolved as compounds from the exhausted cathode material of spent cells. Depending on a desired proportion, or ratio, of the desired materials, raw materials are added to the solution to achieve the desired ratio of the commingled compounds for the recycled cathode material for new cells. The desired materials precipitate out of solution without extensive heating or separation of the desired materials into individual compounds or elements. The resulting active cathode material has the predetermined ratio for use in new cells, and avoids high heat typically required to separate the useful elements because the desired materials remain commingled in solution.

13 Claims, 8 Drawing Sheets

Related U.S. Application Data

(60) Provisional application No. 62/259,161, filed on Nov. 24, 2015, provisional application No. 61/620,051, filed on Apr. 4, 2012.

(51) Int. Cl.

| | | |
|---|---|---|
| *C01G 53/00* | (2006.01) | |
| *C22B 3/02* | (2006.01) | |
| *C22B 7/00* | (2006.01) | |
| *C22B 47/00* | (2006.01) | |
| *H01M 4/505* | (2010.01) | |
| *H01M 4/525* | (2010.01) | |
| *C22B 26/12* | (2006.01) | |
| *H01M 10/0525* | (2010.01) | |

(52) U.S. Cl.
CPC ............. *C22B 7/006* (2013.01); *C22B 26/12* (2013.01); *C22B 47/00* (2013.01); *H01M 4/505* (2013.01); *H01M 4/525* (2013.01); *H01M 10/0525* (2013.01); *Y02P 10/234* (2015.11); *Y02W 30/84* (2015.05)

(58) Field of Classification Search
USPC .............................................. 429/49; 423/50
See application file for complete search history.

(56) References Cited

U.S. PATENT DOCUMENTS

| | | |
|---|---|---|
| 6,447,669 B1 | 9/2002 | Lain |
| 6,524,737 B1 | 2/2003 | Tanii et al. |
| 6,844,103 B2 | 1/2005 | Lee et al. |
| 7,169,206 B2 | 1/2007 | Cheret et al. |
| 7,713,396 B2 | 5/2010 | Kakuta et al. |
| 7,820,317 B2 | 10/2010 | Tedjar et al. |
| 7,833,646 B2 | 11/2010 | Zenger et al. |
| 8,067,107 B2 | 11/2011 | Sloop et al. |
| 8,298,502 B2 | 10/2012 | Yamaoka et al. |
| 2013/0302226 A1 | 11/2013 | Wang et al. |

METHOD AND APPARATUS FOR RECYCLING LITHIUM-ION BATTERIES

RELATED APPLICATIONS

This patent application claims the benefit under 35 U.S.C. § 119(e) of U.S. Provisional Patent App. No. 62/259,161, filed Nov. 24, 2015, entitled "METHOD AND APPARATUS FOR RECYCLING LITHIUM-ION BATTERIES," and is a Continuation-in-Part (CIP) of U.S. patent application Ser. No. 13/855,994, filed Apr. 3, 2013, entitled "METHOD AND APPARATUS FOR RECYCLING LITHIUM-ION BATTERIES," which claims the benefit under 35 U.S.C. § 119(e) of U.S. Provisional Patent App. No. 61/620,051, filed Apr. 4, 2012, entitled "FULL CLOSED LOOP FOR RECYCLING LITHIUM ION BATTERIES," all incorporated herein by reference in entirety.

STATEMENT OF FEDERALLY SPONSORED RESEARCH

This invention was made with government support under grants NSF-1464535 and NSF-1343439, awarded by the National Science Foundation. The government has certain rights in the invention.

BACKGROUND

For decades, portable electrical power supplies have taken the form of batteries that release electrical energy from an electrochemical reaction. Various battery chemistries, such as traditional "dry cell" carbon flashlight batteries, and lead acid "wet" cells common in automobiles have provided adequate portable electrical power. Modern electronics, however, place significantly greater demands on the longevity and mass of batteries. Battery power has traditionally come at a premium of the mass required for the charge material for generating sufficient current. Conventional flashlight batteries deliver only low current. Automobile batteries for delivering an intense but brief high amperage flow to a starter motor are very dense and large. Modern electronic devices, such as cell phones, computing devices, and automobiles, demand substantial current delivery while being lightweight and small enough to avoid hindering the portability of the host device.

Rechargeable nickel-cadmium (NiCad) and nickel metal hydride (NiMH) had gained popularity for rechargeable batteries for portable devices. Recently, however, advances in lithium-ion batteries (LIBs) have been significant such that they have become the most popular power source for portable electronics equipment, and are also growing in popularity for military, electric vehicle, and aerospace applications. Continuing development of personnel electronics, hybrid and electric vehicles, ensures that Li-ion batteries will continue to be increasingly in demand.

SUMMARY

Exhausted LIBs undergo a physical separation process for removing solid battery components, such as casing and plastics, and electrodes are dissolved in a solution for extracting the useful elements Co (cobalt), Ni (nickel), Mn (manganese), and Li (lithium), from mixed cathode materials and utilizing the recycled elements to produce active materials for new batteries. Configurations herein are based, in part, on the observation that conventional approaches do not recycle and recover Li-ion batteries with $LiNiCoAlO_2$, which is being used in automobile application (for example Tesla™ electric vehicles).

The solution includes compounds of desirable materials such as cobalt, nickel and manganese dissolved as compounds from the exhausted cathode material of spent cells. Depending on a desired proportion, or ratio, of the desired materials, raw materials are added to the solution to achieve the desired ratio of the commingled compounds for the recycled cathode material for new cells. A strong base, such as sodium hydroxide, raises the pH such that the desired materials precipitate out of solution without extensive heating or separation of the desired materials into individual compounds or elements. The resulting active cathode material has the predetermined ratio for use in new cells, and avoids high heat typically required to separate the useful elements because the desired materials remain commingled in solution and undergo only a change in concentration (ratio) by adding small amounts of pure charge material to achieve a target composition.

Lithium-ion batteries, like their NiCd (nickel-cadmium) and NiMH (nickel-metal hydride) predecessors, have a finite number of charge cycles. It is therefore expected that LIBs will become a significant component of the solid waste stream, as numerous electric vehicles reach the end of their lifespan. Recycling of the charge material in the lithium batteries both reduces waste volume and yields active charge material for new batteries.

Recycling can dramatically reduce the required lithium amount. Various chemicals in lithium ion batteries include valuable metals such as cobalt, manganese, and nickel. Additionally, battery disposal would require that fresh metals be mined for cathode material, and mining has a much bigger environmental impact and cost than simple recycling would. In short, recycling of lithium ion batteries not only protects the environment and saves energy, but also presents a lucrative outlet for battery manufacturers by providing an inexpensive supply of active cathode material for new batteries.

Current recycling procedures for Li-ion cells are generally focused on $LiCoO_2$ cathode materials. Although some posted their methods to recycle more kinds of cathode materials, all are complex and not necessarily economical or practical. A simple methodology with high efficiency is proposed in order to recycle Li-ion batteries economically and with industrial viability. The disclosed approach results in synthesis of cathode materials (particularly valuable in Li-ion batteries) from recycled components. In contrast to conventional approaches, the disclosed approach does not separate Ni, Mn, and Co out. Instead, uniform-phase precipitation is employed as starting materials to synthesize the cathode materials as active charge material suitable for new batteries. The analytical results showed that the recycling process is practical and has high recovery efficiency, and has commercial value as well.

Configurations herein are based, in part, on the observation that the increasing popularity of lithium ion cells as a source of portable electric power will result in a corresponding increase in spent lithium-based cathode material as the deployed cells reach the end of their useful lifetime. While 97% of lead acid batteries are recycled, such that over 50 percent of the lead supply comes from recycled batteries, lithium ion batteries are not yet being recycled widely. While the projected increase of lithium demand is substantial, analysis of Lithium's geological resource base shows that there is insufficient lithium available in the Earth's crust to sustain electric vehicle manufacture in the volumes required, based solely on Li-ion batteries. Recycling can dramatically reduce the required lithium amount. A recycling infrastructure will ease concerns that the adoption of vehicles that use lithium-ion batteries could lead to a shortage of lithium carbonate and a dependence on countries rich in the supply of global lithium reserves.

Unfortunately, conventional approaches to the above approaches suffer from the shortcoming that recycling approaches include high temperature processes to separate the compounds of the desirable materials of cobalt, manganese, nickel and lithium. This high-temperature process results in breaking down the compounds for separation, but only to recombine them again for new active material. The high temperature approach therefore requires substantial energy, expense, and processing for separating and recombining the desirable materials.

Accordingly, configurations herein substantially overcome the described shortcoming of heat intensive component separation described above by generating a low temperature solution of the desired compounds that is mixed with small amounts of additional pure forms of the desirable materials to achieve a target ratio of the desired active charge materials. The desirable materials are extracted by precipitation to result in recycled active cathode material without separating or breaking down the compounds, allowing a lower temperature and less expensive process to generate the active cathode materials.

The solution includes recovering active materials from lithium ion batteries with $LiNiCoAlO_2$ chemistry in a manner that can be used to make new active materials for new lithium ion batteries. To date, conventional approaches cannot recover transition metals from $LiNiCoAlO2$ in such a form that they can be used to make new cathode materials for $LNiCoO2$ or $LiNiCoAlO2$ batteries without using expensive organic reagents. The recovered precursor material $NiCoAl(OH)_2$ or $NiCo(OH)_2$ can be used for making new $LiNiCoAlO_2$ or $LiNiCoO_2$ cathode materials. This may include adding $Al(OH)_3$ to the precipitated material and/or Ni, Co, or Al sulfates to the solution prior to precipitation.

In the proposed approach, it is desirable that the batteries be of a single stream chemistry ($LiNiCoAlO_2$) however if there are other chemistries present in the $LiMO_2$ (where M is manganese, as well as Ni, Al and Co), the manganese can be removed from solution. Ni, Co and Al can be used to precipitate precursor and synthesize cathode materials.

The claimed approach, outlined in more detail below, defines a method of recycling Li ion batteries including generating a solution of aggregate battery materials from spent cells, and precipitating impurities from the generated solution to result in a charge material precursor. Materials are added to adjust the solution to achieve a predetermined ratio of desirable materials based on desired chemistry of the new, recycled battery. Lithium carbonate is introduced and sintered to form cathode materials in the form of $LiNi_xCo_y$-$Al_zO_2$. Adjusting the desirable materials includes the addition of at least one of Ni, Co or Al, and typically the addition of desirable materials is in the form of salts or ions.

In the approach disclosed below, a method of recycling Li-ion batteries therefore includes generating a solution of aggregate battery materials from spent cells, and precipitating mixtures from the generated solution. A recycler apparatus adjusts the solution to achieve a predetermined ratio of desirable materials, and precipitating the desirable material in the predetermined ratio to form cathode material for a new battery having the predetermined ratio of the desirable materials. It should be noted that although the methods and apparatus disclosed herein employ Li-ion batteries as an example, the principles are intended as illustrative and could be applied to other types of cathode materials suited to other battery chemistries.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
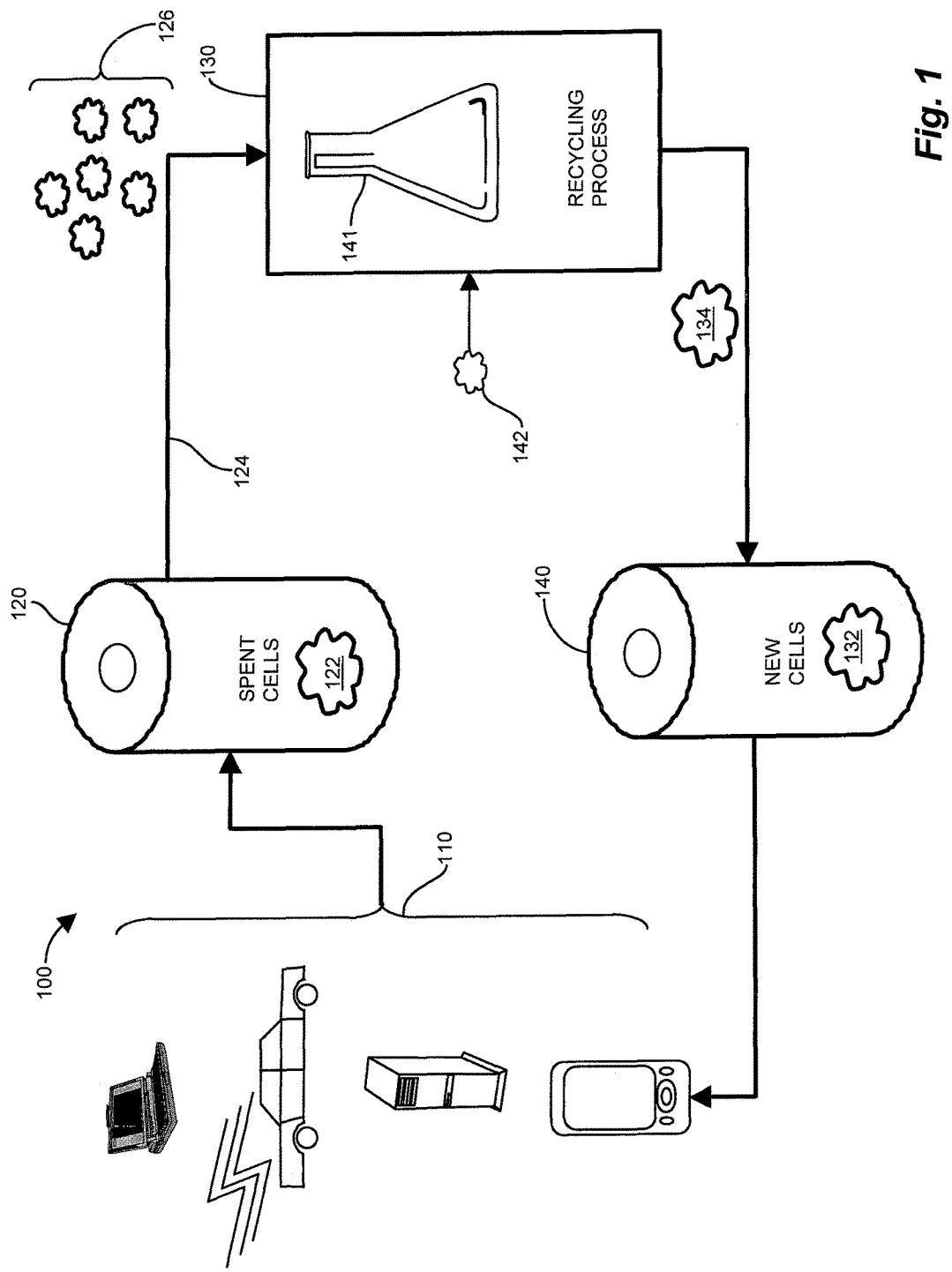
FIG. 1 is a context diagram of a battery recycling environment suitable for use with configurations herein.

Depicted below is an example method and apparatus for recycling batteries such as lithium ion batteries. The proposed approach is an example and is applicable to other lithium and non-lithium batteries for recycling spent batteries and recovering active cathode material suitable for use in new batteries. FIG. 1 is a context diagram of a battery recycling environment 100 suitable for use with configurations herein. Referring to FIG. 1, in the battery recycling environment 100, electronic devices 110 such as laptops, automobiles (hybrid and pure electric), computers, smartphones, and any other type of battery supported equipment is suitable for use with the disclosed approach. The electronic devices contribute spent cells 120, having exhausted cathode material 122 that nonetheless includes the raw materials responsive to the recycling approach discussed herein. A physical separation process 124 dismantles the battery to form a granular mass 126 of the exhausted battery material including the raw materials in particulate form, usually by simply crushing and grinding the spent battery casings and cells therein.

Physical separation is applied to remove the battery cases (plastic) and electrode materials, often via magnetic separation that draws out the magnetic steel. A recycler 130 includes physical containment of a solution 141 including the remaining granular mass 126 from the spent charge materials, typically taking the form of a powder from the agitated (crushed) spent batteries. Additional raw materials 142 are added to achieve a predetermined ratio of the desirable materials in the solution 141. Following the recycling process, as discussed further below, active charge materials 134 result and are employed to form new cells 140 including the recycled cathode material 132. The new cells 140 may then be employed in the various types of devices 110 that contributed the exhausted, spent cells 120. The recycler may include an apparatus for containing the solution 141 such that a pH adjuster or modifier and raw materials may be added to the solution 141.

Figure 2:
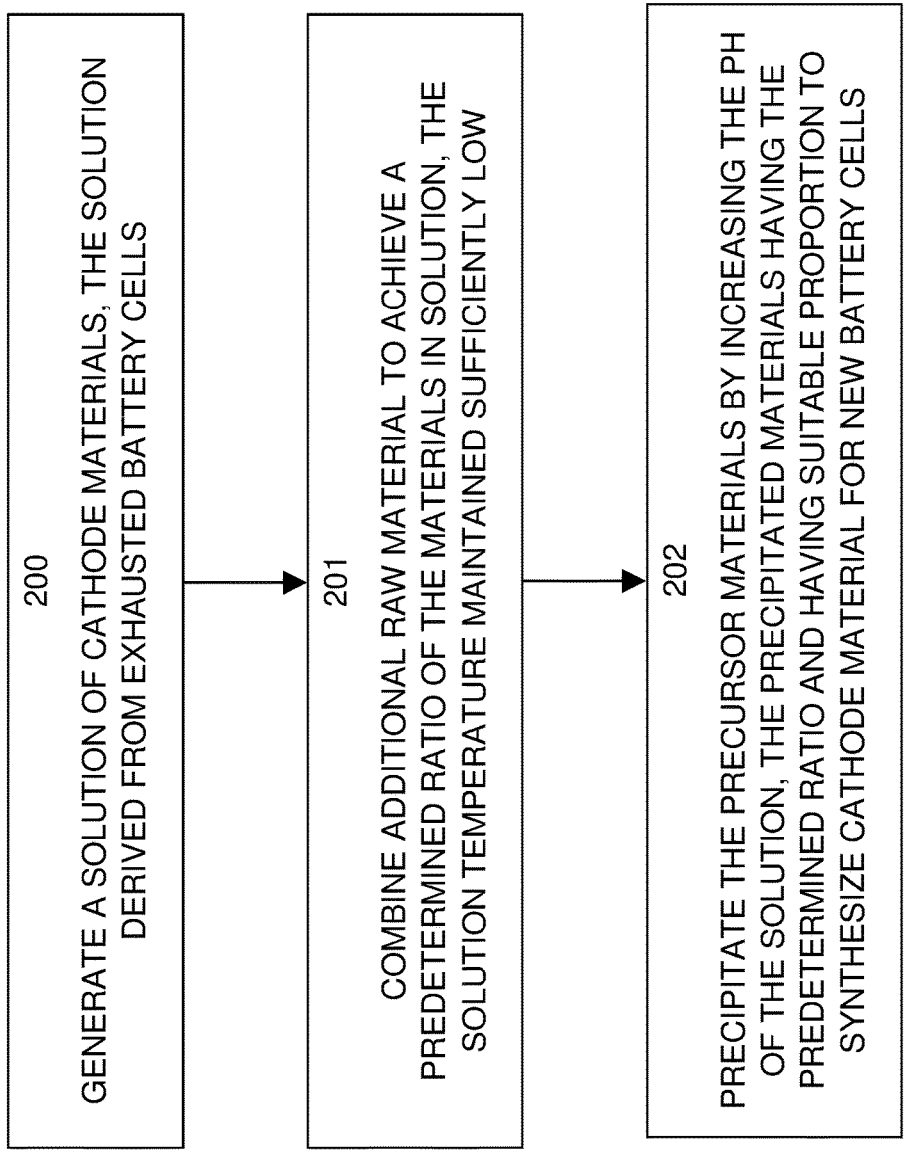
FIG. 2 is a flowchart of lithium battery recycling in the environment of FIG. 1.

FIG. 2 is a flowchart of lithium battery recycling in the environment of FIG. 1. Referring to FIGS. 1 and 2, the method of recycling cathode material 122 as disclosed herein includes generating a solution 141 from cathode materials derived from exhausted battery cells 120, as depicted at step 200. The method combines additional raw material 142 to achieve a predetermined ratio of the materials in solution 141, and is such that the solution temperature is maintained sufficiently low for avoiding high temperature process common in conventional recycling approaches. The solution 141 precipitates the precursor materials 134 by increasing the pH of the solution 141, such that the precipitated materials 134 have the predetermined ratio and having suitable proportion for use to synthesize the cathode material 132 for the new battery cells 140. In the example configuration, the desirable materials include manganese (Mn), cobalt (Co), and nickel (Ni) extracted from cathode material of battery cells. In the solution 141, the desirable materials remaining commingled during precipitation such that the resulting cathode material 134 has the correct proportion for usage in the new cells 140.

Figure 3:
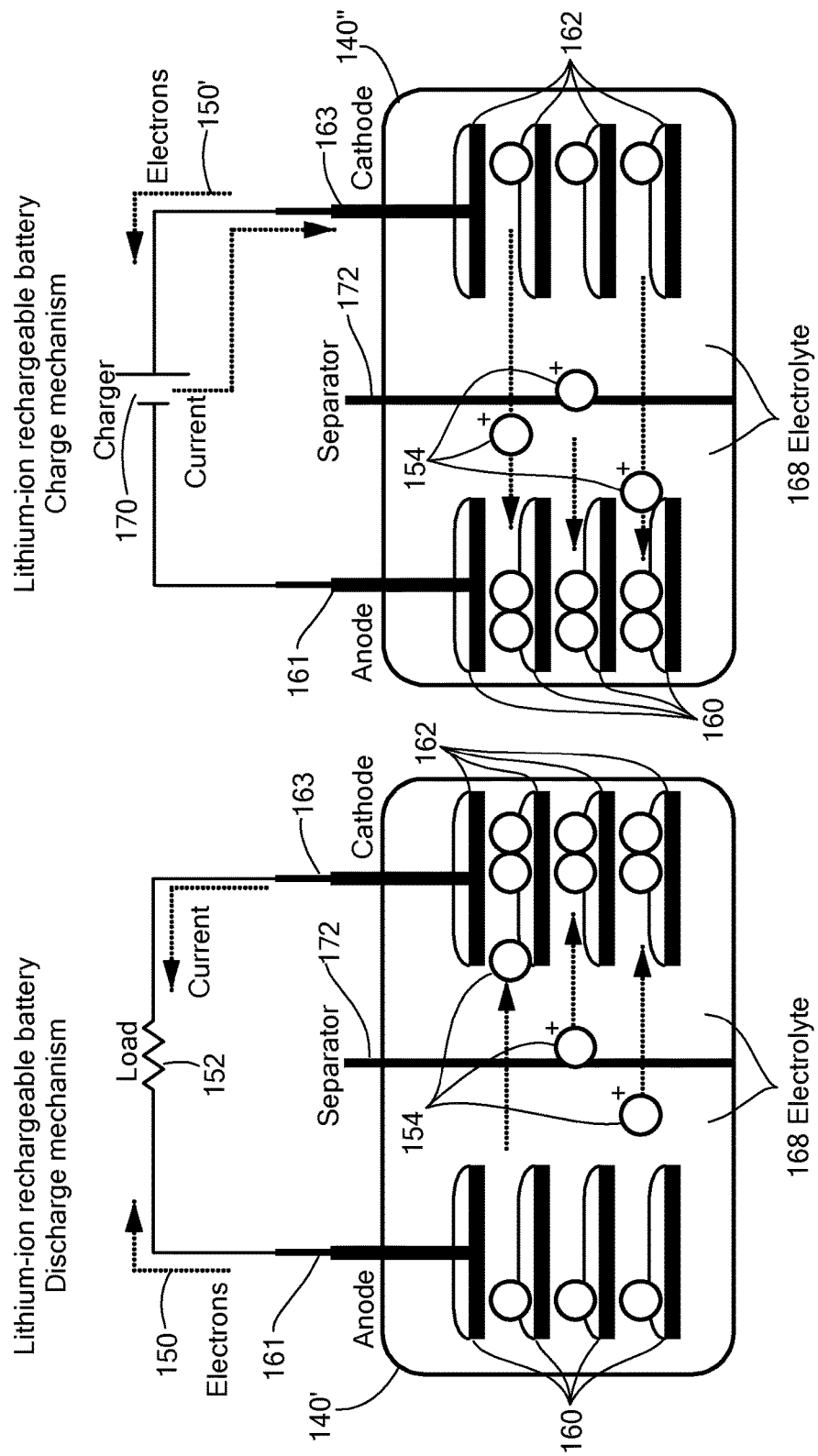
FIG. 3 is a diagram of charge flow (electrons) during charging and discharging of the batteries of FIG. 1.

FIG. 3 is a diagram of charge flow (electrons) during charging and discharging of the batteries of FIG. 1. Batteries in general produce an electron flow via an electrochemical reaction that causes an electrical current from the electron flow to provide the electrical power, coupled with a corresponding flow of ions in the battery between an anode and cathode. Referring to FIGS. 1 and 3, a lithium-ion battery (LIB) 140' generates a negative electron flow 150 to power an electrical load 152 in a reversible manner (for recharge), similar to other rechargeable batteries. During charging, a charger 170 provides a voltage source that causes the electron flow 151' to reverse. Lithium ions 154 move from the negative electrode 160 to the positive electrode 162 during discharge, and back when charging. An anode tab 161 electrically connects the negative electrodes 160 for connection to the load 152/charger 170, and a cathode tab 163 connects the positive electrodes 162. An electrolyte 168 surrounds the electrodes for facilitating ion 154 transfer. A separator prevents contact between the anode 160 and cathode 162 to allow ionic transfer via the electrolyte 168 so that the anode and cathode plates do not "short out" from contact. The positive electrode 162 half-reaction (cathode reaction), take LiCoO2 as an example:

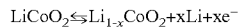

The negative electrode 160 half-reaction is:

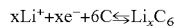

Overall cell reaction:

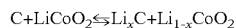

During charging, the transition metal cobalt is oxidized from $Co^{3+}$ to $Co^{4+}$, and reduced from $Co^{4+}$ to $Co^{3+}$ during discharge.

Figure 4:
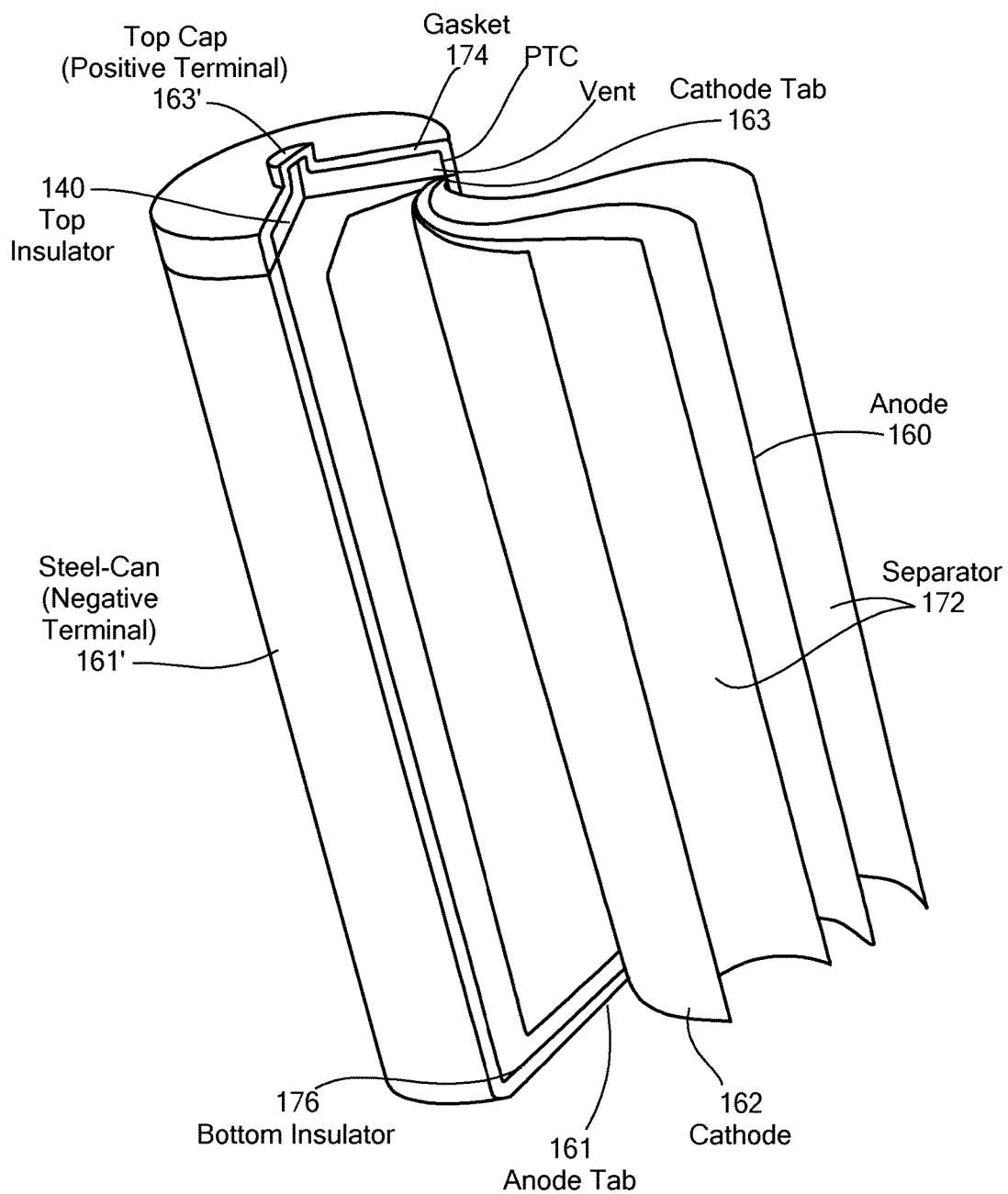
FIG. 4 is a diagram of battery structure of the batteries of FIG. 1.

FIG. 4 is a diagram of battery structure of FIG. 1. Referring to FIGS. 3 and 4, the physical structure of the cell 140 is a cylinder encapsulation of rolled sheets defining the negative electrode 160 and the positive electrode 162.

Primary functional parts of the lithium-ion battery 140 are the anode 160, cathode, 162 electrolyte 168, and separator 172. LIBs use an intercalated lithium compound as the electrode materials. The most commercially popular anode 160 (negative) electrode material contains graphite, carbon and PVDF (polyvinylidene fluoride) binder, coated on copper foil. The cathode 162 (positive) electrode contains cathode material, carbon, and PVDF binder, coated on aluminum foil. The cathode 162 material is generally one of three kinds of materials: a layered oxide (such as lithium cobalt or nickel oxide), a polyanion (such as lithium iron phosphate), or a spinel (such as lithium manganese oxide), and defines the cathode material 122 and recycled cathode material 132 as disclosed herein. Alternatively, the disclosed approach for recycling cathode material may be applied to other materials in various battery components, such as anodic and electrolyte components. The electrolyte 168 is typically a mixture of organic carbonates, generally use non-coordinating anion salts such as lithium hexafluorophosphate ($LiPF_6$). The electrolyte 168 acts as an ionic path between electrodes. The outside metal casing defines the negative terminal 161', coupled to the anode tab 161, and the top cap 163' connects to the cathode tab 163. A gasket 174 and bottom insulator 176 maintains electrical separation between the polarized components.

Conventional approaches for recycling focus on $LiCoO_2$ in spent LIBs. However, with the development of lithium ion battery technologies, different cathode materials are now being used to produce lithium ion batteries such as $LiCoO_2$, LiFePO4, $LiMnO_2$, $LiNi_xCo_yAl_zO_2$ and $LiNi_xMn_yCo_zO_2$. It can be complex to sort out lithium ion batteries based on the battery chemistry and conventional methods cannot effectively recycle lithium ion batteries with mixed chemistries because different procedures are required to separate the respective compounds for reuse as active cathode material.

The cathode materials widely used in commercial lithium ion batteries include $LiCoO_2$, $LiMn_2O_4$, $LiNiO_2$, $LiNi_xCo_y$-$Al_zO_2$, $LiNi_xMn_yCo_zO_2$ and $LiFePO_4$. In order to recycle lithium ion batteries effectively, it is beneficial to consider all the various battery chemistries. Thus, it is beneficial to develop a simpler and environmentally acceptable recycling process generally applicable to various widely used LIBs used widely. Configurations disclosed herein present an example to extract compounds including the desirable elements of Co, Ni, Mn, and Li from mixed cathode materials and utilize the recycled materials to produce active materials for batteries. Alternate chemistries may be recycled using the methods disclosed.

Figure 5:
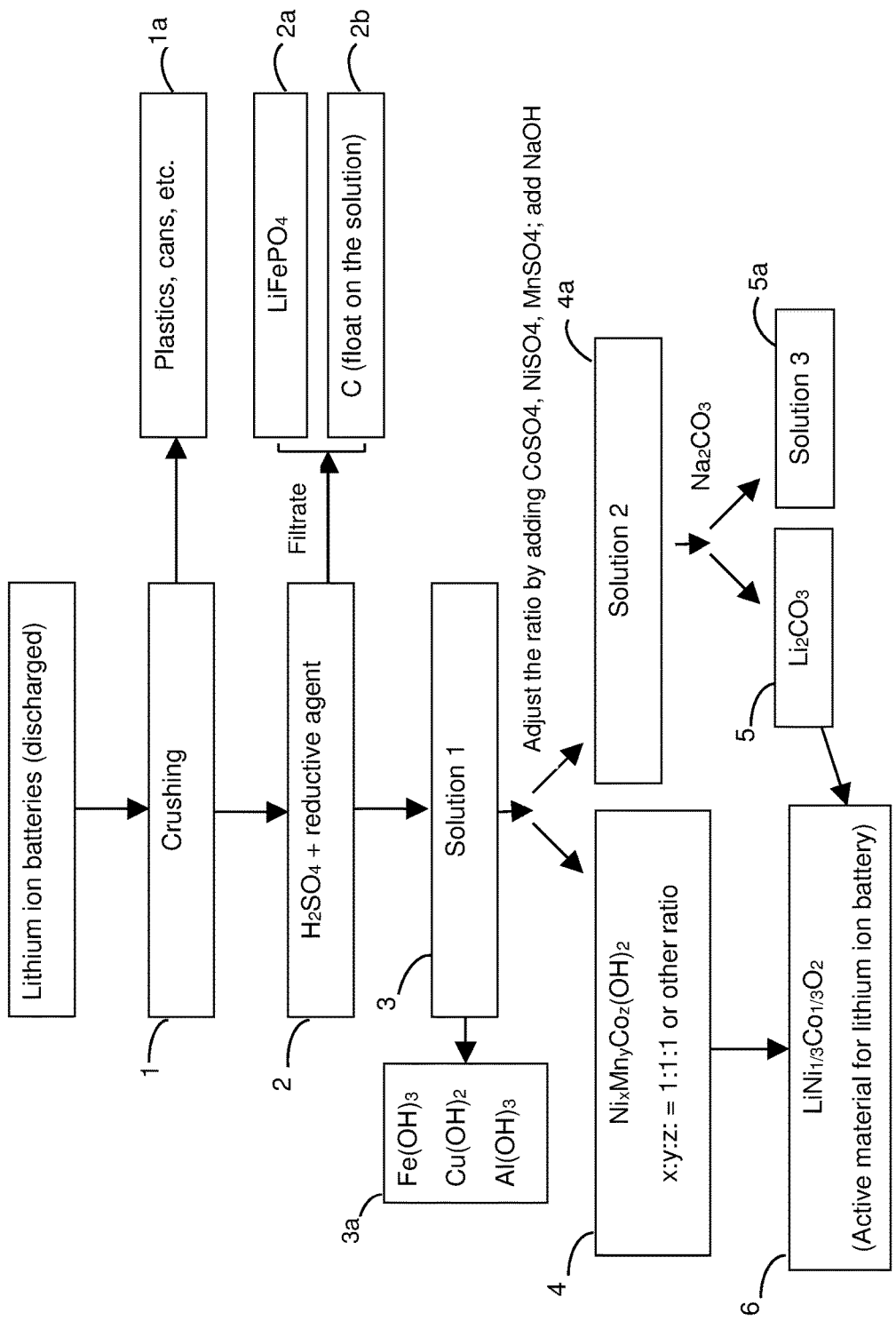
FIG. 5 is a diagram of recycling the cathode material in the battery of FIG. 4.

FIG. 5 is a diagram of recycling the cathode material in the battery of FIG. 4. Referring to FIGS. 1, 4 and 5, at step 1 discharged Li ion batteries 120 are crushed/shredded. Mechanical separation processes are applied as a pretreatment to separate the outer cases and shells and the plastic fraction, as shown at step 1a.

The sieved cathode powder will be leached by 4M sulfuric acid ($H_2SO_4$) and 29-32% hydrogen peroxide for about 2-3 hours at 70-80° C., as depicted at step 2. Other concentrations of sulfuric acid may also be employed. Addition of hydrogen peroxide $H_2O_2$ changes not only Fe2+ to Fe3+, but also other metal ions Mn, Ni, Co to 2+, thus leading to separate iron by controlling pH of the solution in step 3. After filtration, residual LiFeO4 and carbon can be separated by centrifugation, as shown at step 2a. Other impurities are also removed from the surface of the solution, as shown at step 2b.

The metallic elements of interest are transfer to the aqueous solution as the crushed raw cathode materials form a granular mass 126 used to generate the solution of aggregate battery materials from the spent cells, as depicted at step 3. This includes the desirable materials of Co (cobalt), Ni (nickel), Mn (manganese), and Li (lithium in the example shown; other desirable materials may be employed using the present approach with alternate battery chemistries. The pH is adjusted to extract iron, copper and aluminum as $Fe(OH)_3$, $Cu(OH)_2$ and $Al(OH)_3$. This involves adjusting the pH to a range between 3.0-7.0. Accordingly, NaOH solution is added to adjust pH number to deposit $Fe(OH)_3$, Cu(OH)2 and Al(OH)3 which have a lower solubility constant, and keep $Mn^{2+}$, $Co^{2+}$, $Ni^{2+}$ in the solution, then $Fe(OH)_3$, Cu(OH)2 and Al(OH)3 are separated by filtration. It should be noted that the above processes include maintaining the solution 141 at a temperature between 40 deg. C. and 80 deg. C., thus avoiding high heat required in conventional approaches.

The desirable materials are now dissolved in the solution 141. Based on the predetermined target ratio of the desirable materials, the solution is adjusted to achieve the predetermined ratio of desirable materials. In the example approach, this is a 1:1:1 combination of cobalt, manganese and nickel, although any suitable ratio could be employed. Therefore, adjusting the solution includes identifying a desired ratio of the desirable materials for use in recycled cathode material resulting from the generated solution 141, and adding raw materials 142 to achieve the desired ratio, such that the raw materials include additional quantities of the desirable materials and subsequently adding the new raw materials to attain the predetermined ratio. Adding the raw materials includes adding additional quantities of the desirable materials for achieving the desired ratio without separating the individual desirable materials already in solution form, therefore the mixed desirable materials (Co, Mn, Ni) do not need to be separately drawn or extracted as in conventional approaches, which usually involve high heat to break the molecular bonds of the compounds. Furthermore, in an alternate configuration, selected metallic elements can be separated from the solution, which can be used to synthesize particular cathode materials. Therefore, the pH may be adjusted to extract one or more metal ions or other elements prior to adjusting the solution for the predetermined ratio of desirable materials, and subsequent extract the remaining desirable materials in the predetermined ratio.

Rather, the concentration of $Mn^{2+}$, $Co^{2+}$, $Ni^{2+}$ in the solution is tested, and adjusted the ratio of them to 1:1:1 or other suitable ratio with additional $CoSO_4$, $NiSO_4$, $MnSO_4$. NaOH solution is added to increase the pH to around 11, usually within a range of 10.0-13, thus adjusting a pH of the solution such that the desirable materials for the new (recycled) charge materials precipitate. $Ni_{1/3}Mn_{1/3}Co_{1/3}(OH)_2$ or $Ni_{1/3}Mn_{1/3}Co_{1/3}O(OH)$ or a mixture thereof can be coprecipitated such that the respective mole ratio is 1:1:1, as depicted at step 4. $Ni_xMn_yCo_z(OH)_2$ or $Ni_xMn_yCo_zO(OH)$ or a mixture with different ratios of x, y, and z can also be precipitated. $Na_2CO_3$ is added in the solution to deposit $Li_2CO_3$, as depicted at step 5. Finally, the recovered $Ni_{1/3}Mn_{1/3}Co_{1/3}(OH)_2$ and $Li_2CO_3$ are sintered to produce the cathode material.

In the example arrangement, the desirable materials include manganese (Mn), cobalt (Co), and nickel (Ni) extracted from charge material 122 of the spent battery cells 120, in which the desirable materials remain commingled in the solution 141 during precipitation. Adjusting the pH includes adding a substance, such as NaOH (sodium hydroxide, also referred to as lye or caustic soda) for raising the pH such that the desirable materials precipitate, however any suitable substance for raising the pH may be employed. The end result is that adjusting the pH includes adding sodium hydroxide for raising the pH to permit precipitation of the desirable materials for use as cathode precursor material without separately precipitating the individual compounds defining the desirable materials. The precipitation of the desirable materials occurs at temperatures below 80 deg. C., avoiding high heat required in conventional approaches. It should be further noted that, in contrast to conventional approaches, the desirable materials remain commingled during precipitation as a combined hydroxide (OH), $(OH)_2$ or carbonate $(CO_3)$. The addition of the additional charge materials for adjusting the ratio achieves the desired molar ratio for the resulting recycled battery. The intermediate, or precursor form will result in a lithium oxide form following sintering with lithium carbonate $Li_2CO_3$.

$Na_2CO_3$ is added in the solution to deposit $Li_2CO_3$ at about 40° C. After filtrating, $Li_2CO_3$ can be recycled as the starting material to synthesis the active cathode material $LiNi_{1/3}Mn_{1/3}Co_{1/3}O_2$, as shown at steps 5 and 5a. Therefore, the method adds back the lithium to the precipitated desirable materials to form active cathode material suitable for the new battery, and precipitates the desirable material in the predetermined ratio to form charge material for a new battery 140 having the predetermined ratio of the desirable materials.

The coprecipitated materials $Ni_{1/3}Mn_{1/3}Co_{1/3}(OH)_2$ or $Ni_{1/3}Mn_{1/3}Co_{1/3}O(OH)$ or their mixture and recovered $Li_2CO_3$, with additional $Li_2CO_3$ in molar ratio 1.1 of Li versus M (M=$Ni_{1/3}Mn_{1/3}Co_{1/3}$), are mixed and grinded in mortar, as depicted at step 6. The mixture may be reformulated by any suitable processing to form the active cathode material 134 for new batteries 140. In the example approach, the mixture was sintered at 900 for 15 hours. The reaction product may be ground into powder for subsequent distribution and reformation into new cells 140. The $LiNi_{1/3}Mn_{1/3}Co_{1/3}O_2$ is sintered by a high temperature solid-state method at 900° C. for 15 hours.

Battery chemistries including aluminum (Al) are becoming popular for applications such as electric vehicles, using chemistry such as $LiNiCoAlO_2$. Conventional approaches for recovering active materials from lithium ion batteries with chemistry $LiNiCoAlO_2$ in a manner that can be used to make new active materials for new lithium ion batteries have been met with several shortcomings. Conventional processes cannot recover transition metals from $LiNiCoAlO_2$ in such a form that they can be used to make new cathode materials for $LNiCoO_2$ or $LiNiCoAlO_2$ batteries without using expensive organic reagents. The recovered precursor material $NiCoAl(OH)_2$ or $NiCo(OH)_2$ can be used for making new $LiNiCoAlO_2$ or $LiNiCoO_2$ cathode materials. This may include adding $Al(OH)_3$ to the precipitated material and/or Ni,Co, or Al sulfates to the solution prior to precipitation. One specific example is that solution of nickel and cobalt sulfates was from recycled material. $Al_2(SO_4)_3.18H_2O$ as Al starting material was dissolved in distilled water. Subsequently, chelating agent 5-sulfosalicylic acid was dissolved in the solution of aluminum sulfates. Solutions of transition metal sulfates, aluminum sulfate, ammonia, and NaOH were pumped into a continuous stirred tank reactor. Total concentration of solutions of the metal sulfates was 1.5 M or other concentrations. Concentration of the chelating agent is 0.05M-0.5M. pH was controlled 10-pH. Stirring speed was 500-1000 rpm and the temperature was controlled in 30-60° C. After the reaction, $NiCoAl(OH)_2$ co-precipitate was filtered, washed and dried. The metal hydroxide co-precipitate precursor was mixed with 5% excess lithium carbonate thoroughly. The mixture was at first calcined at 450° C. for 4-6 h in air, and then sintered at 750-850° C. for 15-20 h in an oxygen atmosphere or air to obtain $LiNi_xCo_yAl_zO2$ powder to form charge material suitable for use in new batteries.

For such a recycling operation, it is desirable that the batteries be of a single stream chemistry ($LiNiCoAlO_2$) however if there are other chemistries present in the $LiMO_2$ (where M is manganese, as well as Ni, Al and Co), the manganese can be removed from solution. Ni, Co and Al can be used to precipitate precursor and synthesize cathode materials.

Figure 6:
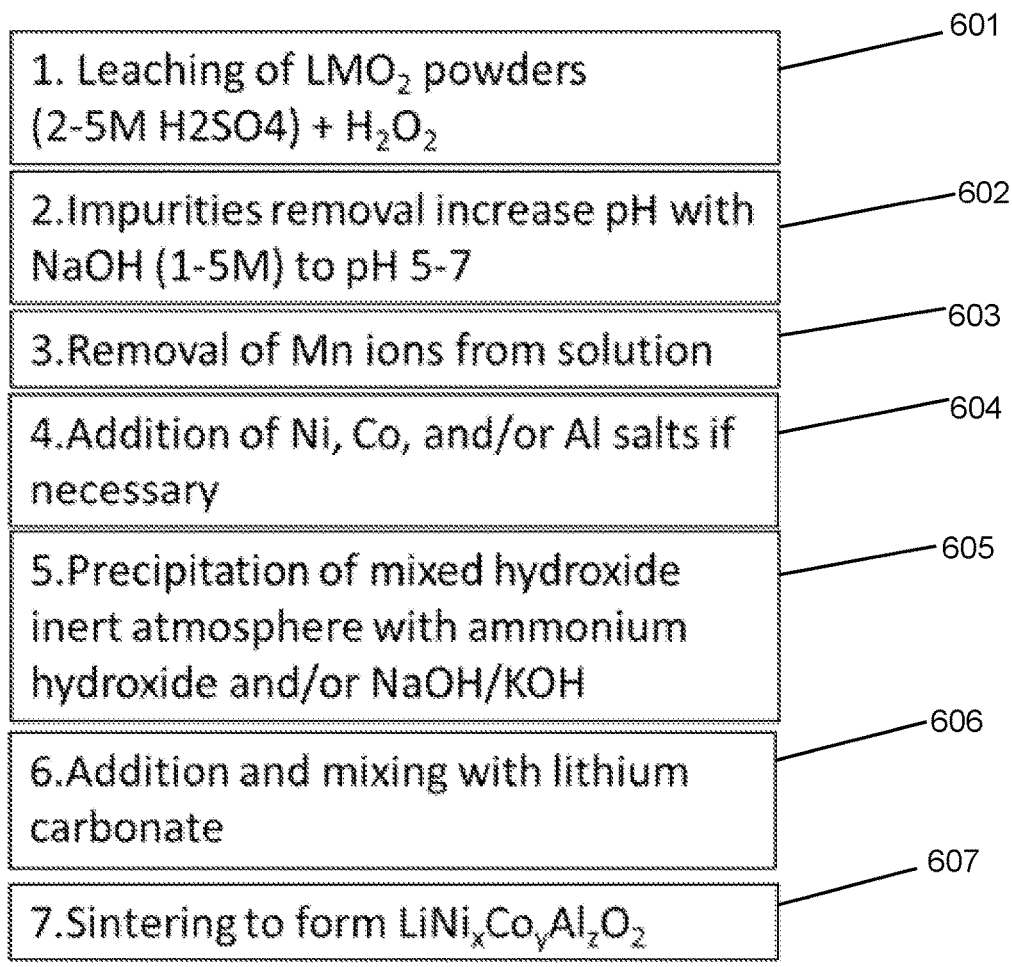
FIG. 6 is a process flow diagram of recycling lithium-aluminum ion batteries.
Figure 7:
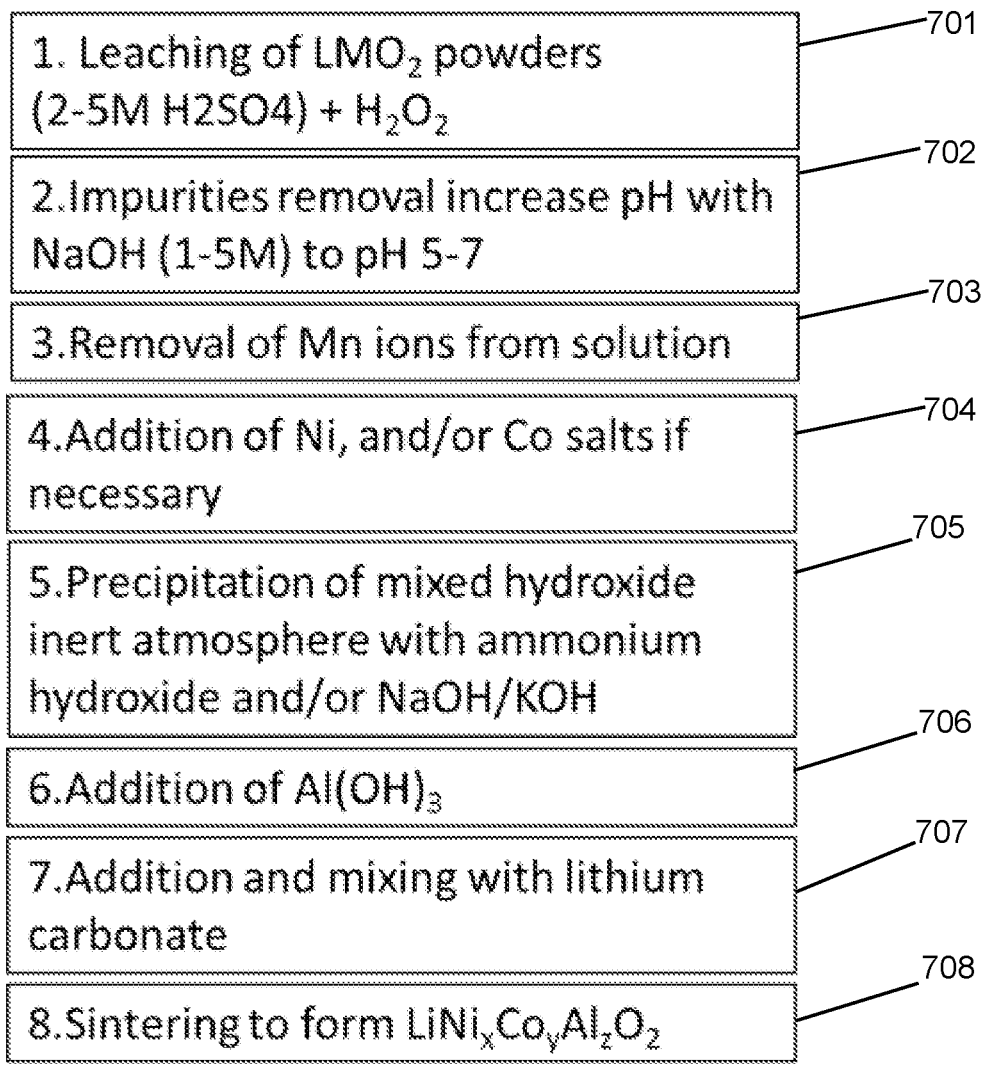
FIG. 7 is a process flow for an alternate configuration of recycling lithium-aluminum batteries using aluminum hydroxide.

For the recovery and synthesis of $LiNiCoAlO_2$ there are at least two approaches. FIG. 6 is a process flow diagram of recycling lithium ion batteries. FIG. 7 is a process flow for an alternate configuration of recycling lithium ion batteries using aluminum hydroxide.

Referring to FIG. 6, in order to undergo the recovery process, the cathode powders must be separated from the batteries/current collectors. Physical agitation of spent cell materials are used to extract cathode material by leaching crushed spent battery materials in a sealed system or containment to separate current collectors in a solution, as depicted at step 601. An example method of how this could be done is by shredding and sizing. Then the powders can be leached into solution using a combination of sulfuric acid and hydrogen peroxide, thus leaching may include forming a solution from addition of at least one of hydrogen peroxide and sulfuric acid. Impurities can be removed by adjusting a pH of the solution for removing impurities by precipitating hydroxides and filtering. This may be performed by increasing the pH to 5-7, precipitating the respective hydroxides and filtering, as disclosed at step 602. Aluminum hydroxide may also be removed in this step. At step 603, Mn ions in the solution can also be removed by adding suitable chemicals. The concentration of ions in solution will be measured and adjusted to the desired ratio based on the industrial needs. This includes adding at least one of Ni, Co and aluminum salts based on a desired composition of resulting recovered charge materials, as depicted at step 604. It may be desirable to increase the pH above 7 prior to adding $Al(SO4)_3$ or $Al(OH)_3$ or other aluminum salts to the solution. Precursor materials may then be recovered by precipitating using at least one of sodium hydroxide or potassium hydroxide, as shown at step 605. Sintering the recovered precursor materials with lithium carbonate forms active cathode material, as depicted at steps 606 and 607. The precipitate from step 605 can be sold to material or battery manufacturers or can then be mixed and sintered with the lithium carbonate to form active $LiNiCoAlO_2$.

In an alternate configuration, depicted in FIG. 7, no aluminum is added to solution and $Al(OH)_3$ is added to the material after precipitation, after mixing it is sintered with lithium carbonate to form the active material. Therefore, referring to FIG. 7, steps 701-703 proceed as their counterparts in FIG. 6. If it is desirable to recover $LiNiCoO_2$ material the procedure follows FIG. 6 but no aluminum is added back into the solution or precipitate. Accordingly, the process includes adding only Ni or Co prior to precipitating the recovered charge materials at step 704. The process defers addition of aluminum hydroxide (step 706) until after precipitation (step 705) and before sintering at step 708. In general, using the processes depicted in FIGS. 6 and 7, active charge material formed includes $LiNi_xCo_xAl_zO2$ where x, y and z are integers defining the composition of the resulting active charge material. Other materials including Cu, Al, steel, carbon, lithium carbonate, and other materials including transition metals can also be recovered In an alternate arrangement, the above approaches converge to a single stream recycling process including both Ni/Mn/Co (NMC) and Ni/Co/Al (NCA) chemistries, by recognizing the common aspects of pH changes and recombining pure (virgin) cathode materials to form a combined precursor having a molar ratio based on the chemistry requirements for the new, recycled cathode materials.

Figure 8:
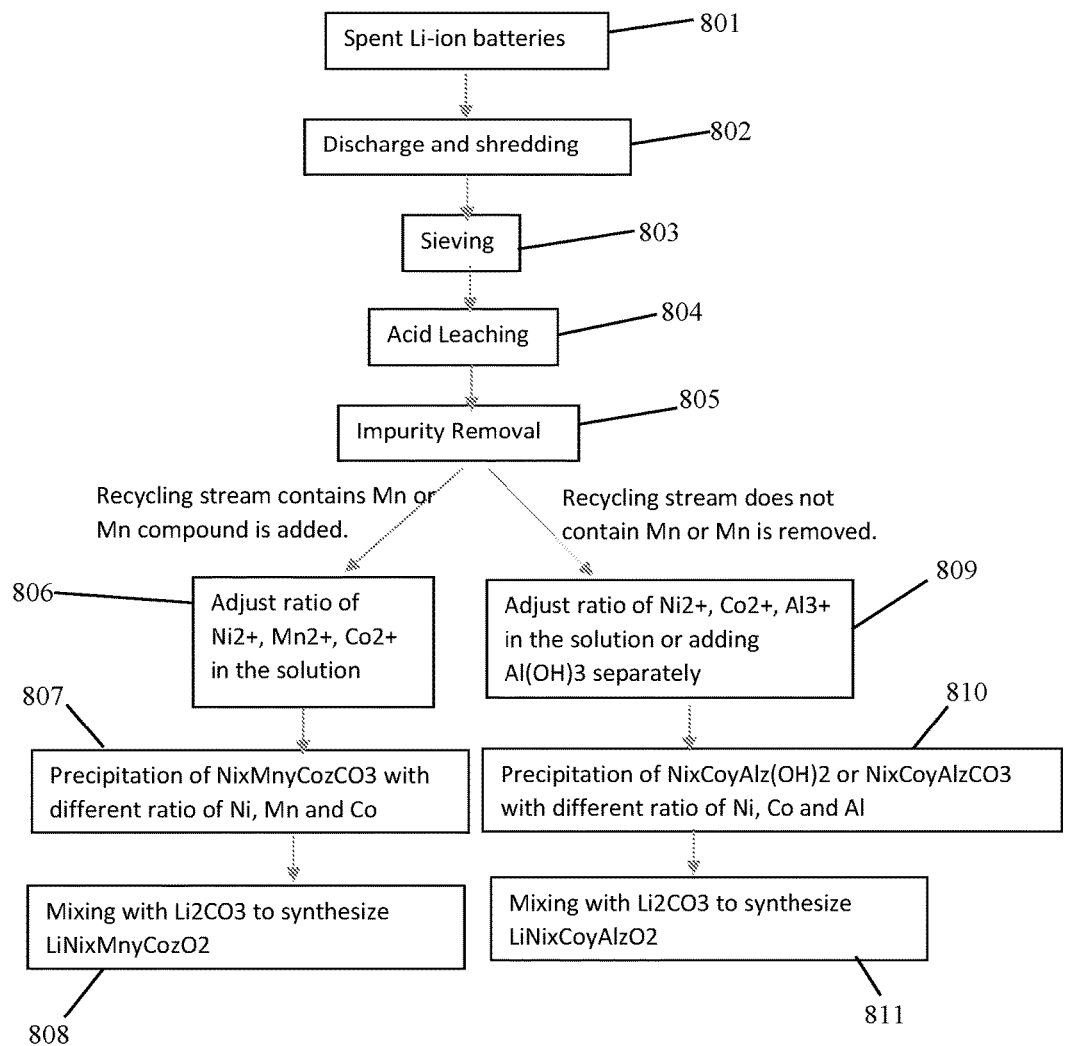
FIG. 8 is a process flow diagram for a combined recycling process for both Ni/Mn/Co (NMC) and Ni/Co/Al (NCA) batteries for any suitable molar ratio.

FIG. 8 is a process flow diagram for a combined recycling process for both Ni/Mn/Co and Ni/Co/Al batteries for any suitable molar ratio. In the approach of FIG. 8, the following benefits are achieved:

1. Both $LiNi_xMn_yCo_zO_2$ and $LiNi_xCo_yAl_zO_2$ are cathode materials for Li-ion batteries. These cathode materials can be synthesized in the recycling process. These recovered cathode materials have similar performance with the virgin materials and can be used to make new batteries.

2. In the flow chart of FIG. 8, both $LiNi_xMn_yCo_zO_2$ with different ratio of Ni, Mn and Co, and $LiNi_xCo_yAl_zO2$ with different ratio of Ni, Co and Al are recovered. $LiNi_xMn_yCo_zO2$ and LiNixCoyAlzO2 can be synthesized by sintering their carbonates or hydroxides with $Li_2CO_3$. In our previous patent, $LiNi_xMn_yCo_zO2$ is synthesized by sintering $Ni_xMn_yCo_z(OH)_2$ and $Li_2CO_3$. It should be noted that both the elemental composition (e.g. NMC or NCA) and the molar ratio of those elements are determined both by the molar ratios following leaching, and the addition of pure raw materials to the leached solution, designated by the subscripts x,y,z specifying the respective molar ratios. Other suitable battery chemistries may be formed using the disclosed approach.

3. Based on the recycling stream, $LiNi_xMn_yCo_zO2$ or $LiNi_xCo_yAl_zO2$ can be synthesized. If the recycling stream includes Mn based batteries or Mn compound is added, LiNixMnyCozO2 is synthesized. If the recycling stream does not include Mn based batteries or Mn is removed, LiNixCoyAlzO2 is synthesized.

4. For both LiNixMnyCozO2 and LiNixCoyAlzO2, impurities can be removed by increasing the pH to 5-7, precipitating their hydroxides and filtering.

5. The carbonate and hydroxide precursor precipitates can be obtained by controlling their solubility in the solution.

In FIG. 8, the processing of the recycling stream for generating new charge material for the recycled battery is shown. The method for recycling lithium-ion batteries, comprising includes, at step 801, receiving a recycling stream of expended, discarded and/or spent lithium ion batteries, and agitating the batteries to expose the internal components and charge material by physical crushing, shredding and/or disengagement to provide surface area open to liquid exposure, as depicted at step 802.

Physical sieving and filtering remove casing, separators and large extraneous materials at step 803, and an acid leaching process commenced at step 804. A leached solution is formed by combining crushed battery material from the lithium battery recycling stream with an acidic leach agent and hydrogen peroxide ($H_2O_2$) to separate cathode materials from undissolved material, as depicted at step 804. A low pH solvent bath, leach liquor or other suitable combination immerses the agitated materials of the recycling stream for dissolving the cathode materials such as Ni, Mn, Co and Al. The acidic leach agent may be concentration of sulfuric acid in the range of 2-5 M (molar), and in a particular arrangement, the acidic leach agent is 4M sulfuric acid.

A particular feature of the disclosed approach is adaptability to various target chemistries for the recycled batteries, and sourced from various unknown chemistries in the recycling stream. Design or demand specifications determine material parameters for a recycled battery by identifying a molar ratio and elements of cathode materials corresponding to a charge material chemistry of a recycled battery. Battery usage as directed by a customer, for example, may be an overriding factor, such as automotive electric or hybrid vehicle usage, portable electronic devices, etc. The identified battery chemistry, specifying particular elements and molar ratios, results in the specific electrical characteristics of the recycled batteries produced by the disclosed approach.

Following dissolution in the leach solution, a test or sample is employed to determine a composition of the leach solution by identifying a molar ratio of the ions dissolved therein, thus clarifying the previously unknown collective composition of the input recycling stream. Recall that all charge material has remained comingled in the leach solution-extraction or precipitation of individual elements has not been required.

Based on the determined composition, Ni, Co, Mn or Al salts in a sulfate ($xSO_4$) or hydroxide ($xOH$) form are added to the leach solution to adjust the molar ratio of the dissolved cathode material salts in the leach solution to correspond to the identified molar ratio for the recycled battery. Depending on the expected battery chemistry, for example, a NMC chemistry with 1:1:1 ratio may be sought, or alternatively, a NCA chemistry with 1:2:1. Any suitable ratio and combination of charge materials may be selected. One particular selection may be the determination of whether manganese (Mn) is included or whether NCA manganese-free formulation will be employed.

Prior to adjusting the molar ratio, impurities may be precipitated from the leach solution by adding sodium hydroxide until the pH is in a range between 5.0-7.0 for precipitating hydroxide forms of the impurities outside the determined material parameters, as depicted at step 805.

The determined battery chemistry and source recycling stream results in a decision point from step 805. If the chemistry for the recycled battery include manganese (Mn), then the cathode material salts include Ni, Mn and Co in a hydroxide form, as depicted at step 806. Otherwise, if the recycled battery is devoid of Mn, then the cathode material salts include Ni, Co and Al in a hydroxide form, as shown at step 809. In the non-Mn formulation, prior to adding raw material for adjusting the molar ratio, manganese ions may be removed from the leach solution.

Following the branch at step 805, in general, sodium hydroxide is added for raising the pH of the leach solution to at least 10 for precipitating and filtering metal ions of the cathode materials to form a charge material precursor by coprecipitating the Ni, Co, Mn and Al salts remaining in the leach solution as a combined hydroxide (OH), $(OH)_2$ or carbonate ($CO_3$) having a molar ratio corresponding to the identified molar ratio for the recycled battery, the charge precursor material responsive to sintering for forming active cathode materials in an oxide form following sintering with lithium carbonate ($Li2CO_3$).

In either step, charge precursor material is generated by raising the pH to a range of 10-13.0 for precipitating hydroxide charge material, and more specifically, may include raising pH by adding sodium hydroxide to increase the pH to 11.0, as depicted at steps 807 and 810. The resulting charge material precursor has the form $Ni_xMn_yCo_z(OH)2$, $Ni_xMn_yCo_zCO3$, $Ni_xCo_yAl_z(OH)2$ or $Ni_xCo_yAl_zCO3$ where the molar ratios defined by x, y, and z are based on the determined material parameters of the recycled battery, as depicted at steps 808 and 811.

In a more general sense, the aluminum sulfate is mixed with a chelating agent, and the aluminum sulfate solution and nickel cobalt sulfate solutions are added with ammonium water and sodium hydroxide to a reactor. A pH monitor constantly monitors and releases additional sodium hydroxide to maintain the pH at 10.0 or other suitable pH to result in coprecipitation of the NCA precursor.

The generalized process of FIG. 8 is intended to accommodate Al based battery chemistries without Mn, but may also be used for any suitable formulation by modifying the molar ratios at steps 806 or 809, as applicable.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for recycling lithium-ion batteries, comprising:

identifying a molar ratio for cathode materials for a recycled battery;

forming a leach solution by combining crushed battery material from a lithium battery recycling stream with an acidic leach agent and hydrogen peroxide to separate cathode materials from undissolved materials;

filtering the undissolved materials from the leach solution to leave dissolved salts of cathode materials remaining in the leach solution;

determining a composition of the leach solution by identifying a molar ratio of the cathode material salts dissolved therein;

adding, based on the determined composition, at least one of Ni, Co, Mn or Al salts in a sulfate or hydroxide form to adjust the molar ratio of the dissolved cathode material salts in the leach solution to correspond to the identified molar ratio for the recycled battery, including adding a solution of aluminum sulfate and a chelating agent to the leach solution; and raising the pH of the leach solution to at least 10 for precipitating and filtering metal ions of the cathode materials to form a charge material precursor by coprecipitating the Ni, Co, Mn and Al salts remaining in the leach solution as a combined hydroxide or carbonate having a molar ratio corresponding to the identified molar ratio for the recycled battery, the charge precursor material responsive to sintering for forming active cathode materials in an oxide form following sintering with lithium carbonate ($Li_2CO_3$).

2. The method of claim 1 further comprising, prior to adjusting the molar ratio, precipitating impurities from the leach solution by adding sodium hydroxide until the pH is in a range between 5.0-7.0 for precipitating hydroxides of impurities.

3. The method of claim 1 further comprising raising the pH to a range of 10-13.0 for precipitating hydroxide precursor material.

4. The method of claim 3 further comprising raising pH by adding sodium hydroxide to increase the pH to 11.0.

5. The method of claim 1 wherein the cathode material salts include Ni, Mn and Co in a hydroxide form with molar ratios of unequal proportions.

6. The method of claim 1 wherein the cathode material salts include Ni, Co and Al in a hydroxide form with molar ratios of unequal proportions.

7. The method of claim 1 wherein the acidic leach agent is sulfuric acid having a concentration of 2-5 M (molar).

8. The method of claim 7 wherein the acidic leach agent is 4M sulfuric acid.

9. The method of claim 1 wherein the charge material precursor is $Ni_xMn_yCo_z(OH)_2$, $Ni_xMn_yCo_zCO_3$, $Ni_xCo_yAl_z(OH)_2$ or $Ni_xCo_yAl_zCO_3$ where the molar ratios defined by x, y, and z are based on the determined composition of the recycled battery.

10. The method of claim 6 further comprising, prior to adding the cathode material salts for adjusting the molar ratio, removing manganese ions from the leach solution.

11. The method of claim 1 wherein the added chelating agent is 5-sulfosalicylic acid, further including adding the 5-sulfosalicylic acid to a solution of distilled water and the aluminum sulfates.

12. The method of claim 11 further comprising adding the solution of distilled water and including the aluminum sulfate to the leach solution, the leach solution previously formed in a reactor for coprecipitation, the reactor containing ammonium water and sodium hydroxide.

13. The method of claim 1 wherein the concentration of the chelating agent is 0.05M-0.5M, further comprising stirring the leach solution at 500-1000 rpm at a temperature in the range of 30-60° C.

\* \* \* \* \*